(12) United States Patent
Oh

(10) Patent No.: US 6,573,947 B1
(45) Date of Patent: Jun. 3, 2003

(54) DEVICE AND METHOD OF COMPENSATING FOR DEGRADATION OF RECEIVED SIGNAL

(75) Inventor: Ji-Sung Oh, Kyonggi-do (KR)

(73) Assignee: Samsung Electronics Co., Ltd., Kyungki-do (KR)

( * ) Notice: Subject to any disclaimer, the term of this patent is extended or adjusted under 35 U.S.C. 154(b) by 382 days.

(21) Appl. No.: 09/612,244

(22) Filed: Jul. 7, 2000

(30) Foreign Application Priority Data

Jul. 7, 1999 (KR) .......................................... 1999-27273

(51) Int. Cl.⁷ ................................................ H04N 5/21
(52) U.S. Cl. ........................ 348/607; 348/614; 348/732; 375/346; 455/63
(58) Field of Search .................................. 348/607, 608, 348/611, 613, 614, 725, 470, 21, 471, 726, 731–733; 375/230, 232, 233, 346, 350, 348; 455/63, 65, 311; H04N 5/21

(56) References Cited

U.S. PATENT DOCUMENTS 4,466,134 A * 8/1984 McNicol ...................... 333/18

5,361,400 A * 11/1994 Kazecki et al. ............... 333/18

FOREIGN PATENT DOCUMENTS

| JP | 52-37714 | 3/1977 |
| JP | 52-144221 | 12/1977 |
| JP | 64-12433 | 2/1989 |
| JP | 11-55548 | 2/1999 |

* cited by examiner

Primary Examiner—Michael H. Lee
(74) Attorney, Agent, or Firm—Sughrue Mion, PLLC

(57) ABSTRACT

A device and method of compensating for degradation of a received signal in a digital television receiver is disclosed. The device comprises a pre-distortion filter delaying and gain controlling a digital IF signal according to an input parameter control signal; a synchronizer for demodulating a baseband signal by using a pilot signal included in an output signal of the pre-distortion filter, and restoring timing; a channel equalizer for canceling multipath distortion occurring while a television signal passes a transmission channel; and a controller for outputting a parameter control signal such that a filter tap energy output from the channel equalizer becomes a maximum.

8 Claims, 5 Drawing Sheets

DEVICE AND METHOD OF COMPENSATING FOR DEGRADATION OF RECEIVED SIGNAL

PRIORITY

This application claims priority to an application entitled "Device and Method of Compensating for Degradation of Received Signal" filed in the Korean Industrial Property Office on Jul. 7, 1999 and assigned Serial No. 99-27273, the contents of which are hereby incorporated by reference.

BACKGROUND OF THE INVENTION

1. Field of the Invention

The present invention relates generally to a digital television receiver, and in particular, to a device and method of compensating for receiving degradation of a terrestrial digital television signal transmitted over a multipath channel.

2. Description of the Related Art

An antenna mounted on a digital television (DTV) receiver should be optimally located in order to receive a television signal, in a best condition, transmitted from a terrestrial broadcasting station. A technology for optimizing an antenna position of a digital television receiver is disclosed in U.S. Pat. No. 5,574,509, entitled "Antenna Orientation System for Digital TV Receiver". FIG. 1 shows a digital television receiver having a positionable antenna disclosed in U.S. Pat. No. 5,574,509.

The digital TV receiver disclosed in U.S. Pat. No. 5,574,509 calculates a signal-to-noise ratio (SNR) for a field sync duration existing in a received signal, to display a quality of the received signal using an on-screen display, so as to enable the user to adjust the position of the antenna. When a digital television broadcast is transmitted from one transmitter, it is possible to adjust the antenna position in the above method. However, when the television broadcasts are transmitted over various channels from several transmitters, as in the existing National Television System Committee (NTSC) broadcasting, an optimal antenna position for one broadcast may be the worst antenna position for another broadcast. That is, since the position of the receiving antenna determines the characteristics of a signal receiving path, a variation in the position of a transmitter affects a channel environment of each broadcast. Therefore, it is necessary to change the antenna position according to the channels in order to receive several broadcasts.

Accordingly, it is not possible to set the position of the receiving antenna based on a specific broadcast only. Instead, it is preferable to set the position of the receiving antenna to be able to receive many different broadcasts, if possible. However, in some cases, the antenna position may not be matched to a transmission position of a presently received broadcast, thereby degrading a quality of the received signal. In this case, it is necessary to compensate for degradation of the received signal for each channel to maintain the optimal receiving condition.

SUMMARY OF THE INVENTION

It is therefore, an object of the present invention to provide a device and method for maintaining the best quality of a signal received over a multipath channel without changing an antenna position in a television receiver system.

It is another object of the present invention to provide a device and method of compensating for signal degradation occurring due to deviation of the antenna position from an optimal antenna position before demodulation of a carrier in a digital television receiver.

In accordance with one aspect of the present invention, a device for compensating for degradation of a received signal in a digital television receiver comprises a pre-distortion filter delaying and gain controlling a digital IF signal according to an input parameter control signal; a synchronizer for demodulating a baseband signal by using a pilot signal included in an output signal of the pre-distortion filter, and restoring timing; a channel equalizer for canceling multipath distortion occurring while a television signal passes a transmission channel; and a controller for outputting a parameter control signal such that a filter tap energy output from the channel equalizer becomes a maximum.

In accordance with another aspect of the present invention, a method of compensating for degradation of a received signal in a television receiver having a pre-distortion filter comprises searching received channels upon receipt of a parameter control command; detecting a condition of a received signal while varying a parameter coefficient of the pre-distortion filter in the searched channel; storing a parameter coefficient representing an optimal receiving condition as an optimal parameter coefficient value for a corresponding channel; and reading an optimal value for the corresponding channel whenever selecting a channel out of the searched channels, to compensate for degradation of a received signal.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENT

A preferred embodiment of the present invention will be described herein with reference to the accompanying drawings. In the following description, well-known functions or constructions are not described in detail since they would obscure the invention in unnecessary detail.

Figure 1:
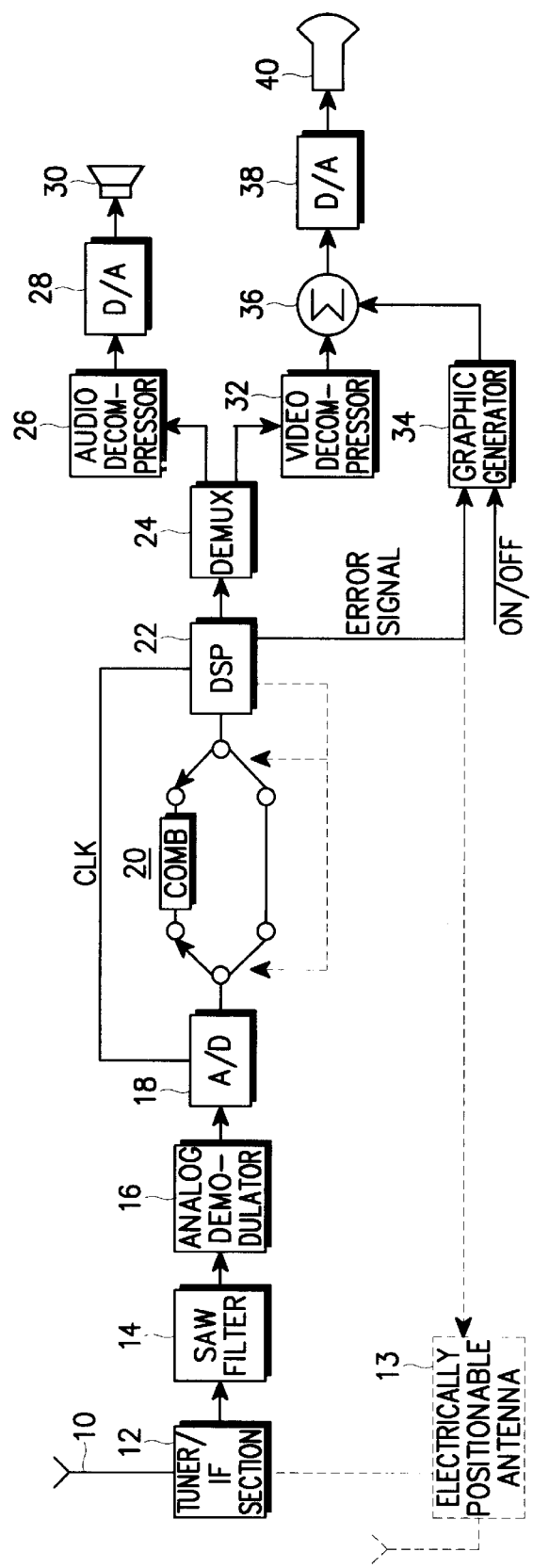
FIG. 1 is a block diagram of a digital television receiver having a positionable antenna according to the prior art.
Figure 2:
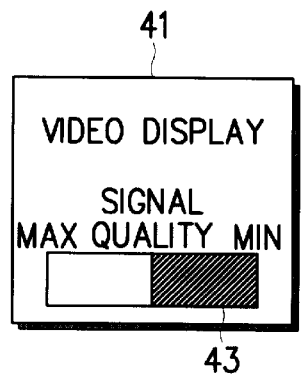
FIG. 2 is a diagram illustrating a quality of a received signal, displayed on a display screen of FIG. 1.
Figure 4:
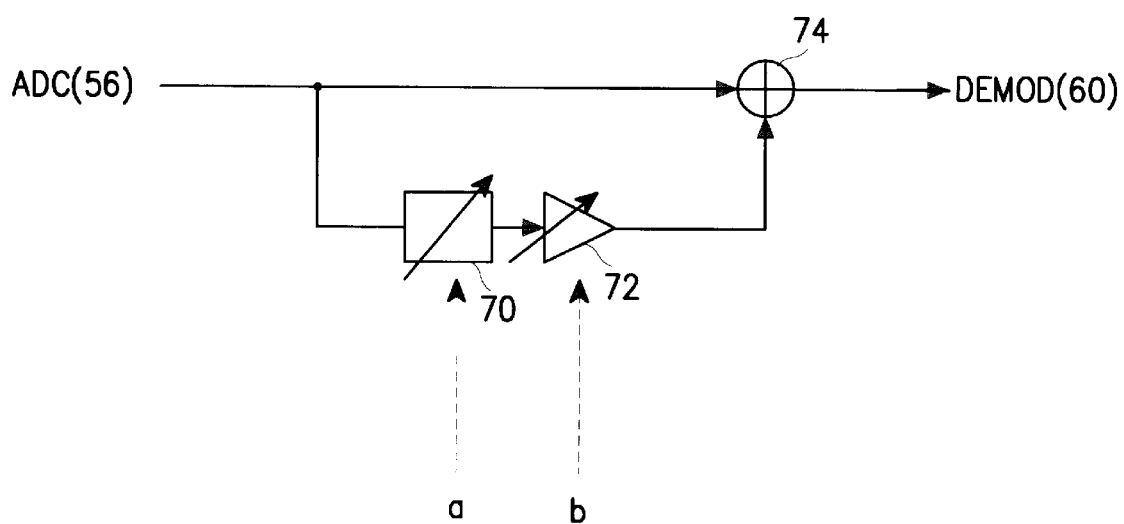
FIG. 4 is a detailed diagram illustrating the pre-distortion filter of FIG. 3.
Figure 3:
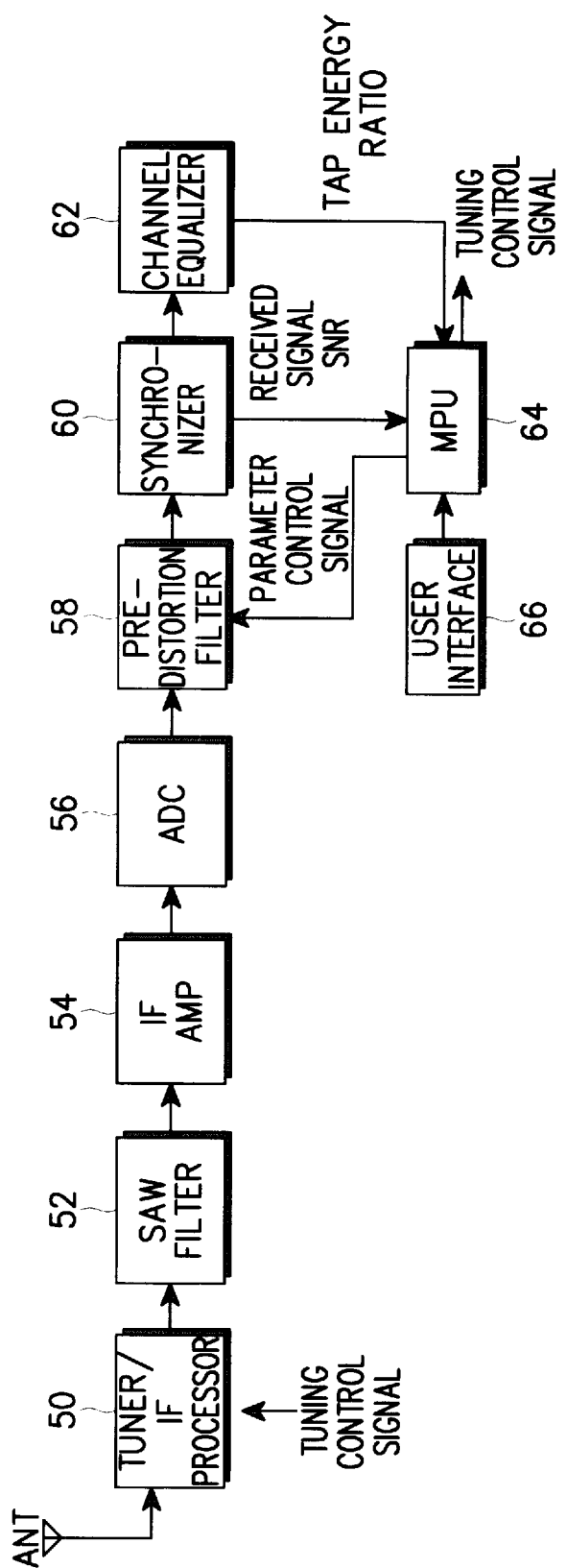
FIG. 3 is a block diagram illustrating a part of a digital television receiver having a device of compensating for degradation of a received signal according to an embodiment of the present invention.

FIG. 3 shows a part of a digital television receiver having a device of compensating for degradation of a received signal according to an embodiment of the present invention. FIG. 4 shows the pre-distortion filter of FIG. 3.

Referring to FIG. 3, a tuner/IF (Intermediate Frequency) processor 50 converts a High Definition Television (HDTV) signal received through an antenna to an IF signal. A Surface Acoustic Wave (SAW) filter 52 filters the IF signal output from the tuner/IF processor 50 into a 6 MHz-band IF signal. An IF amplifier 54 amplifies the 6 MHz-band IF signal output from the SAW filter 52 and an analog-to-digital converter (ADC) 56 converts the amplified IF signal to a digital IF signal. A gain of the IF amplifier 54 is determined according to an automatic gain control (AGC) signal provided from the receiver.

In a subsequent step, a pre-distortion filter 58 has filter parameter (e.g., delay and gain) coefficient values which vary according to a parameter control signal output from a microcomputer unit (MPU) 64. That is, the pre-distortion filter 58 delays and gain controls the digital IF signal received from the ADC 56 according to the parameter control signal. Typically, for the pre-distortion filter 58, a variable Finite Impulse Response (FIR) filter or a variable Infinite Impulse Response (IIR) filter can be used which can vary a delay 70 coefficient and a gain 72 coefficient as shown in FIG. 4. In FIG. 4, 'a' and 'b' denote the parameter control signals of a delay control signal and a gain control signal, respectively.

In an exemplary embodiment of the present invention, a Signal to Noise ratio (SNR) or a filter tap energy of a channel equalizer 62 is used to determine whether or not an optimal signal is received for each channel. The SNR is calculated by squaring a difference between a received data field sync pattern and a data field sync reference pattern. Therefore, the MPU 64 can recognize that the transmission signal is received in the optimal condition, when an error rate (i.e., SNR) of the received signal output from a synchronizer 60 or the channel equalizer 62 is at its minimum.

The channel equalizer 62 cancels multipath distortion (or ghost) occurring when a transmission signal passes the transmission channel. Commonly, the channel equalizer 62 includes a tap forward filter and a feedback filter. Therefore, the MPU 64 can recognize that the received signal has the optimal condition, when a ratio of a main tap energy read from the channel equalizer 62 to other tap energies is at its maximum.

The MPU 64 generates a tuning control signal for searching a specific channel according to a user's command, and stores in its internal memory, the filter parameter coefficient values at which the transmission signal can be received in the optimal condition in the searched channel. That is, the MPU 64 sequentially and variably outputs the parameter control signals in the searched channel during channel scanning. During this operation, the MPU 64 monitors a condition of the signal output from the synchronizer 60 or the channel equalizer 62 and stores a parameter control signal, at which the received signal has the optimal condition, as a parameter control signal for the corresponding channel. Further, the MPU 64 outputs the stored parameter control signal to the pre-distortion filter 58 whenever selecting a specific channel, so that signals are received in the optimal condition at the respective channels.

Figure 5:
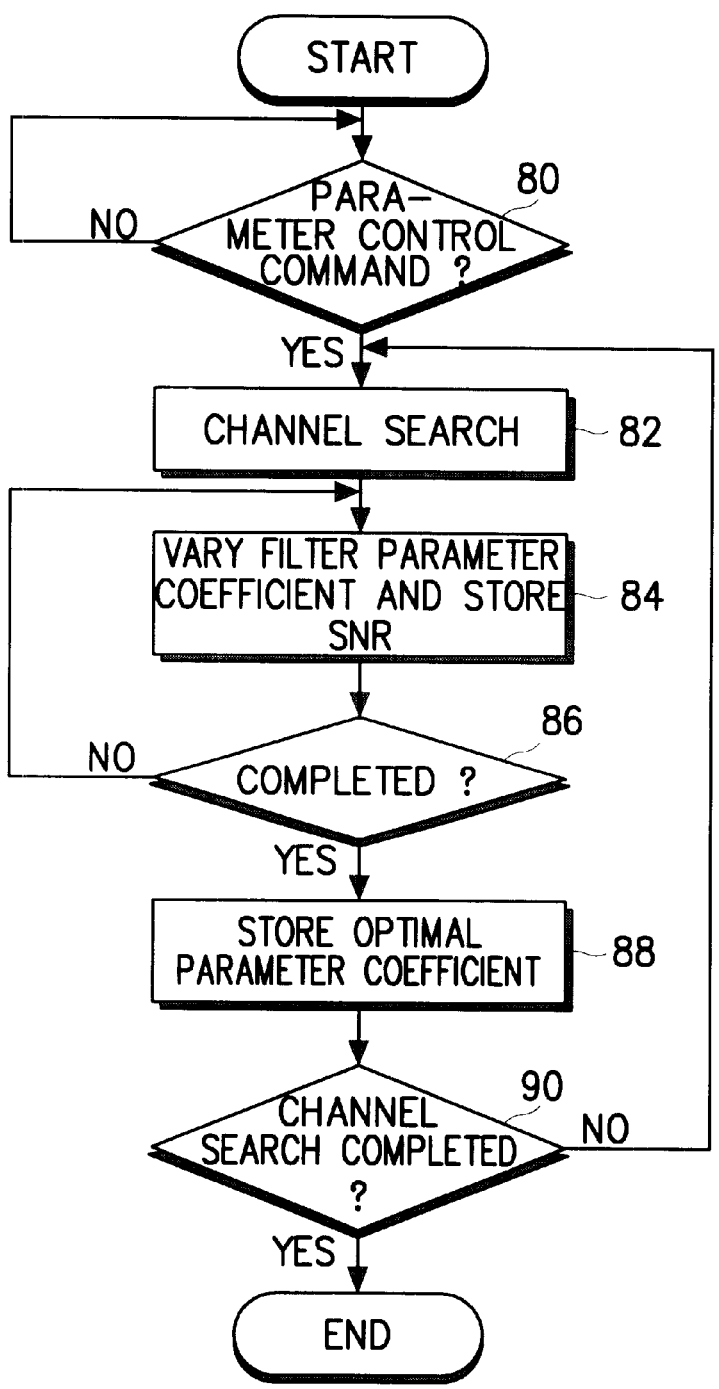
FIG. 5 is a flow chart illustrating a method of compensating for degradation of a received signal according to an embodiment of the present invention.
Figure 6:
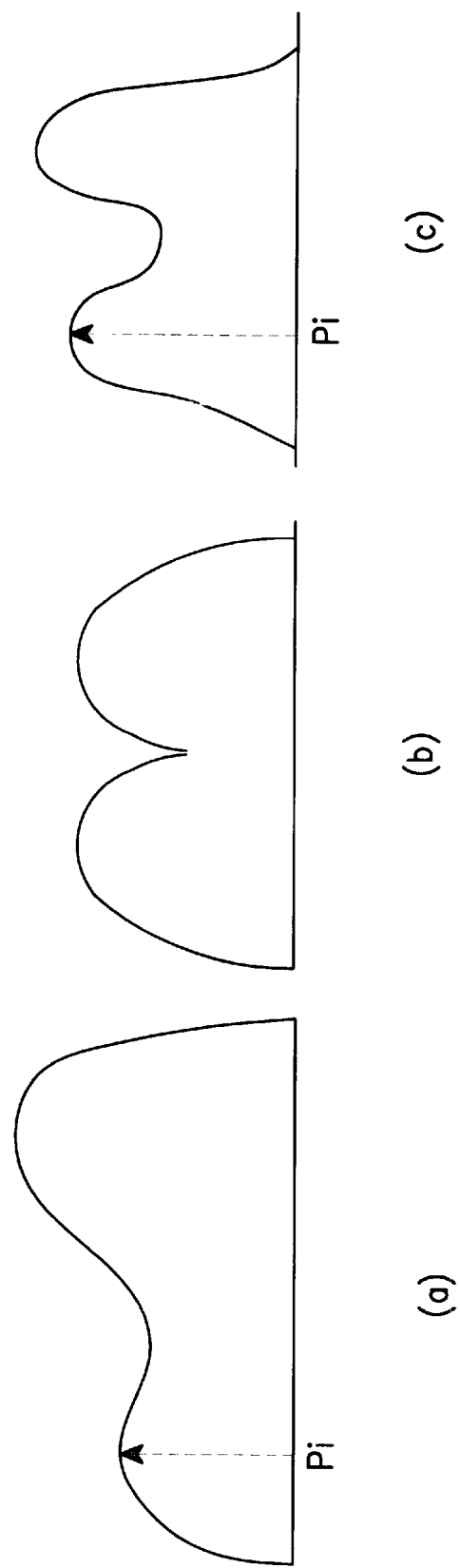
FIGS. 6A to 6C are diagrams illustrating variation of a spectrum by operation of the pre-distortion filter according to an embodiment of the present invention.

Next, a detailed description of the embodiment will be described with reference to FIGS. 5 and 6A to 6C. FIG. 5 shows a method of compensating for degradation of a received signal according to an embodiment of the present invention. FIGS. 6A to 6C are diagrams illustrating variation of a spectrum by operation of the pre-distortion filter according to an embodiment of the present invention.

First, the reason for employing the pre-distortion filter 58 is to convert an input signal of a demodulator to be suitable for demodulation and channel equalization even though the antenna position cannot be changed. If a spectrum of a vestigial sideband (VSB) signal input to the tuner is recessed around a pilot tone Pi as shown in FIG. 6A, it is difficult for the receiver to acquire frequency synchronization using the pilot tone, thus making it impossible to receive the signal. In this case, by controlling the parameter coefficients of the pre-distortion filter 58 so that they have the response characteristics of FIG. 6B and changing the spectrum of the VSB signal as shown in FIG. 6C, it is possible to acquire normal frequency synchronization. Therefore, the embodiment of the present invention variably controls the parameter coefficient values of the pre-distortion filter 58 located at the pre-stage of the synchronizer 60 according to the condition of the signals received at the respective channels, so as to compensate for signal degradation due to incongruity of the antenna position according to the broadcast channels.

Referring to FIG. 5, a procedure for optimizing filter parameter coefficients according to channels will be described. First, the user locates the antenna in an optimal position so as to receive as many broadcast signals as possible. Thereafter, the user issues a parameter control command such that the transmission signals are received in the optimal condition at every channel. This parameter control command can be input using a separate control key mounted on a user interface (e.g., remote controller), or can be input while inputting a general channel search command. When the user inputs the parameter control command using the user interface 66, the MPU 64 detects the input parameter control command in step 80 and proceeds to step 82 to perform channel search on all the received signals while sequentially varying the tuning control signal.

Meanwhile, when a certain channel is searched, the MPU 64 sequentially varies the filter parameter coefficients in steps 84 and 86. Whenever the filter parameter coefficients are varied, the MPU 64 stores in its internal memory the SNR value or the ratio of the main tap energy to other tap energies, provided from the synchronizer 60 or the channel equalizer 20. After completion of the filter parameter coefficient varying process, the MPU 64 detects the stored SNR or tap energy ratio and stores a parameter coefficient representing the minimum error rate (SNR) as an optimal parameter coefficient for the corresponding channel, in step 88. Thereafter, the MPU 64 determines in step 90 whether the channel search is completed or not. When channel search is not completed, the MPU 64 returns to step 82 to search another channel and then selects a filter parameter coefficient in the searched channel by performing steps 84 to 88.

In summary, the MPU 64 selects and stores an optimal filter parameter coefficient value for every received channel. While selecting a specific channel after channel search, the MPU 64 loads the stored filter parameter coefficient value and automatically controls the delay and gain of the pre-distortion filter 58, thereby compensating for signal degradation due to incongruity of the antenna position according to the channels.

As described above, this novel device locates the antenna such that it can receive as many broadcast signals as possible, and automatically controls coefficient values of the pre-distortion filter to compensate for signal degradation occurring due to incongruity of the antenna position according to the broadcast channels, thus making it possible to receive the broadcast signals for the respective channels in the best condition.

While the invention has been shown and described with reference to a certain preferred embodiment thereof, it will be understood by those skilled in the art that various changes in form and details may be made therein without departing from the spirit and scope of the invention as defined by the claims.

What is claimed is:

1. A device of compensating for degradation of a received signal in a television receiver, comprising:
   a pre-distortion filter delaying and gain controlling a digital IF (Intermediate Frequency) signal according to an input parameter control signal;
   a synchronizer for demodulating a baseband signal using a pilot signal included in an output signal of the pre-distortion filter, and restoring timing; and
   a controller for outputting a parameter control signal such that a received signal output from the synchronizer has an optimal condition, wherein the controller includes a memory which stores the parameter control signal representing the optimal condition for each of a plurality of received channels.

2. A device of compensating for degradation of a received signal in a digital television receiver, comprising:
   a pre-distortion filter delaying and gain controlling a digital IF signal according to an input parameter control signal;
   a synchronizer for demodulating a baseband signal by using a pilot signal included in an output signal of the pre-distortion filter, and restoring timing;
   a channel equalizer for canceling multipath distortion occurring while a television signal passes a transmission channel; and
   a controller for outputting a parameter control signal such that a filter tap energy output from the channel equalizer becomes a maximum, wherein the controller includes a memory which stores the parameter control signal representing the maximum filter tap energy for each of a plurality of received channels.

3. A method of compensating for degradation of a received signal in a television receiver having a pre-distortion filter, comprising the steps of:
   upon receipt of a parameter control command, searching received channels;
   detecting a condition of a received signal while varying a parameter coefficient of the pre-distortion filter in the searched channel; and
   storing a parameter coefficient representing an optimal receiving condition as an optimal parameter coefficient value for each of a plurality of corresponding channels.

4. The method as claimed in claim 3, further comprising the step of reading an optimal value for the corresponding channel whenever selecting one of the plurality of channels, to compensate for degradation of a received signal.

5. The method as claimed in claim 3, wherein an error rate of said received signal is calculated by squaring a difference between a data field sync pattern of a received signal and a data field sync reference pattern.

6. The method as claimed in claim 3, wherein said parameter control command is a channel search command.

7. The device of claim 1, wherein the controller outputs the parameter control signal which corresponds to one of the plurality of channels when said one of the plurality of channels is selected.

8. The device of claim 2, wherein the controller outputs the parameter control signal which corresponds to one of the plurality of channels when said one of the plurality of channels is selected.

* * * * *